United States Patent
Morgan et al.

(10) Patent No.: US 12,367,744 B1
(45) Date of Patent: Jul. 22, 2025

(54) VISION-BASED SELF-CHECKOUT SYSTEM AND METHOD FOR THE VISUALLY IMPAIRED

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Jerry Steven Massey, Lawrenceville, GA (US); John Kennedy, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/821,495

(22) Filed: Aug. 30, 2024

(51) Int. Cl.
  *G07G 1/00* (2006.01)
  *G07G 1/01* (2006.01)
  *G09B 21/00* (2006.01)

(52) U.S. Cl.
  CPC ......... *G07G 1/0018* (2013.01); *G07G 1/0045* (2013.01); *G07G 1/01* (2013.01); *G09B 21/004* (2013.01); *G09B 21/006* (2013.01)

(58) Field of Classification Search
  None
  See application file for complete search history.

(56) References Cited

U.S. PATENT DOCUMENTS

| | | | | |
|---|---|---|---|---|
| 6,056,087 | A * | 5/2000 | Addy | G07G 1/0045 235/383 |
| 8,825,531 | B1 * | 9/2014 | Catoe | G07G 1/0018 705/16 |
| 10,429,930 | B2 | 10/2019 | Day | |
| 11,262,971 | B2 | 3/2022 | Ellis | |
| 11,481,751 | B1 * | 10/2022 | Chaubard | G06V 10/82 |
| 2016/0109281 | A1 * | 4/2016 | Herring | G06Q 30/0235 177/1 |

(Continued)

FOREIGN PATENT DOCUMENTS

| | | | |
|---|---|---|---|
| JP | H0619646 U | * | 3/1994 |
| KR | 2523727 B1 | * | 4/2023 |

OTHER PUBLICATIONS

Machine translation of KR-2523727 retrieved from European Patent Office on 3/17/202 (Year: 2025).*

(Continued)

*Primary Examiner* — Suezu Ellis
(74) *Attorney, Agent, or Firm* — Notaro, Michalos & Zaccaria P.C.; John S. Economou

(57) ABSTRACT

A self-service checkout terminal for vision-based checkout includes a computing device having a processor and a memory. A camera coupled to the computing device has a predefined field of view focused on a scan zone and provides a video output signal of the scan zone to the computing device. A checkout tray has a tactile surface formed from a predefined number of rows and a predefined number of columns of raised dot. The checkout tray is positioned within the scan zone. The processor processes the video output signal from the camera to attempt to identify an item placed on the checkout tray by a user during a transaction, provides a description of the item to the user via the user interface when the item is identified, and provides the user of an indication of a location of the item via a user interface when the item is not identified.

14 Claims, 4 Drawing Sheets

(56) References Cited

U.S. PATENT DOCUMENTS

2023/0316786 A1* 10/2023 Habib ....................... G06T 7/70
      382/154
2024/0086879 A1    3/2024 Yepez

OTHER PUBLICATIONS

Machine translation of JP-H0619646 retrieved from J-Plat Pat on Mar. 19, 2025 (Year: 2025).*

* cited by examiner

VISION-BASED SELF-CHECKOUT SYSTEM AND METHOD FOR THE VISUALLY IMPAIRED

FIELD

This disclosure relates generally to a system and method for a vision-based self-checkout system, and more particularly to a vision-based self-checkout system adapted for use by the visually-impaired.

BACKGROUND

Self-service checkout terminals allow a customer to perform the checkout process without the need for any assistance from a cashier or other type of attendant. Such terminals may include a vision system that enables automated item recognition, item tracking, and transaction handling in a self-checkout environment. The vision system uses cameras and associated software to capture image data of items and analyze and interpret the captured image data to identify the items. During the use of such terminals, the customer places some or all of the items to be purchased onto a surface (a "checkout tray") that is completely within the field of view of the several cameras in the vision system. In some cases, the customer may be prompted to move or remove some items. An item might be removed after identification of such item so that the vision system can identify other nearby items that might have been blocked from view by the removed item. An item might need to be moved (e.g., rotated) when the vision system is unable to identify that item. When the customer is visually impaired, however, it may be difficult to locate the particular item on the checkout tray that needs to be moved or removed. In order to properly complete the transaction, the visually impaired customer may be required to move to an attended checkout lane.

The present disclosure describes a technical solution that solves at least the aforementioned technical problems with vision-based self-service checkout terminals.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
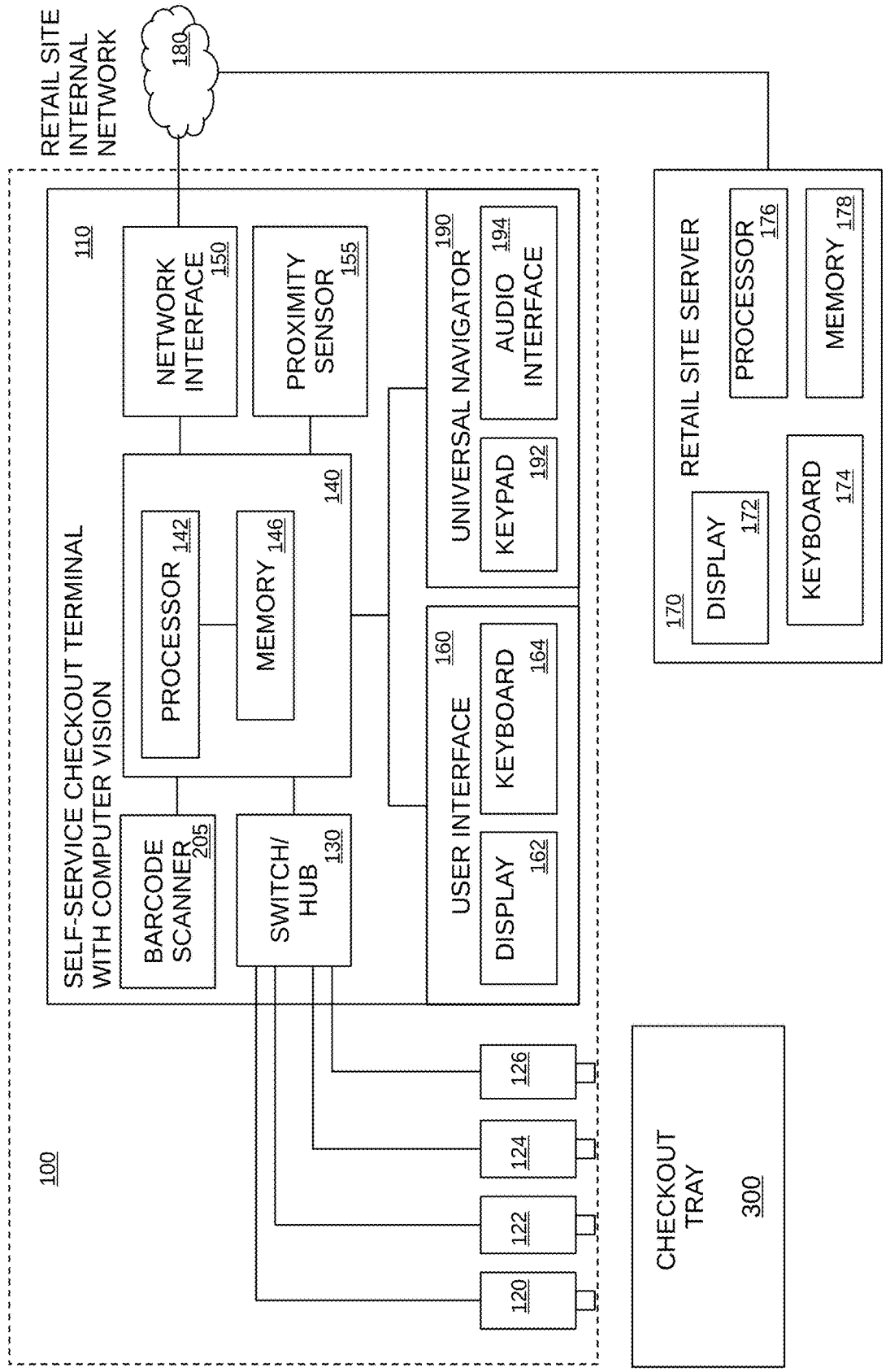
FIG. 1 is a block diagram of a system according to an aspect of the current disclosure.

The present disclosure describes an improved vision-based self-service checkout terminal that includes features that enable a visually impaired customer to perform many of the interactions needed for self-checkout. Referring now to FIG. 1, a self-service checkout terminal 100 with computer vision for use with system and method of the present invention is shown connected to a local network 180. Terminal 100 includes a computing section 110 and a series of cameras (e.g., four cameras 120, 122, 124, 126 are shown in FIG. 1) that are mounted in different positions to focus on a scan zone (in particular a checkout tray 300) of the self-service checkout terminal. Because they are mounted in different positions, each of the cameras 120, 122, 124, 126 will have a different view of the scan zone for the terminal, so that the scan zone will have a particular predefined position within the field of view of each of the cameras 120, 122, 124, 126. Each of the cameras 120, 122, 124, 126 is preferably a network camera (as is known in the art) that is coupled to the computing section 110 via a network switch/hub 130 and transmits the output video signal in a digital format over the network. In other embodiments, the cameras 120, 122, 124, 126 may have a composite video output that are each provided to a video switch and digitizer (not shown) within the computing section 110 for further processing and/or viewing.

The network switch/hub 130 is coupled to a processing portion 140 of the computing section 110 of terminal 100. The processing portion 140 includes a processor 142 and a memory 146. Memory 146 includes both volatile (RAM) portions and nonvolatile (non-transitory computer readable storage medium) portions. Terminal 100 may include more than one processing portion, e.g., one portion for processing the camera signals and performing analysis thereof, and another portion for operating the checkout functions of the terminal. The processing portion 140 is coupled to a user interface 160 for input/output that includes, inter alia, a display 162 and a keyboard 164 (or other type of data entry device). The user interface 160 is used during normal operations of the terminal 100. In addition, the processing portion 140 is also coupled to a second input/output interface 190, sometimes known as a universal navigator or uNav. The uNav 190 includes a keypad 192 with four tactile buttons for up, down, left, and right that are preferably arranged in a diamond shape, and a central button for activating the currently selected option. The uNav 190 also includes an audio interface 194 having an audio jack for private audio, a volume button for controlling this audio, and tactile markings to aid the user in locating each element. A user may couple headphones to the audio jack to receive audible messages. The uNav 190 reduces the need for a user to reach to the touchscreen and offers tactilely discernible input and private audio for the benefit of those with low visual acuity. Finally, the processing portion 140 is coupled to a proximity sensor 155 to detect when a user has approached the terminal 100 and is ready to initiate a transaction, as discussed below. The processing portion 140 is also coupled to a barcode scanner 205 for use when the vision system is unable to identify an item.

Computing section 110 also includes a network interface 150 coupled to processing portion 140 and further coupled to an internal network 180 at a retail store site. A retail site server 170 may be coupled to the network 180 for managing all of the terminals 100 at a particular retail site. The retail site server 170 includes, inter alia, a processor 176, a memory 178, a display 172, and a keyboard (or other user input device) 174. Memory 174 includes both volatile (RAM) portions and nonvolatile (non-transitory computer readable storage medium) portions.

Figure 2:
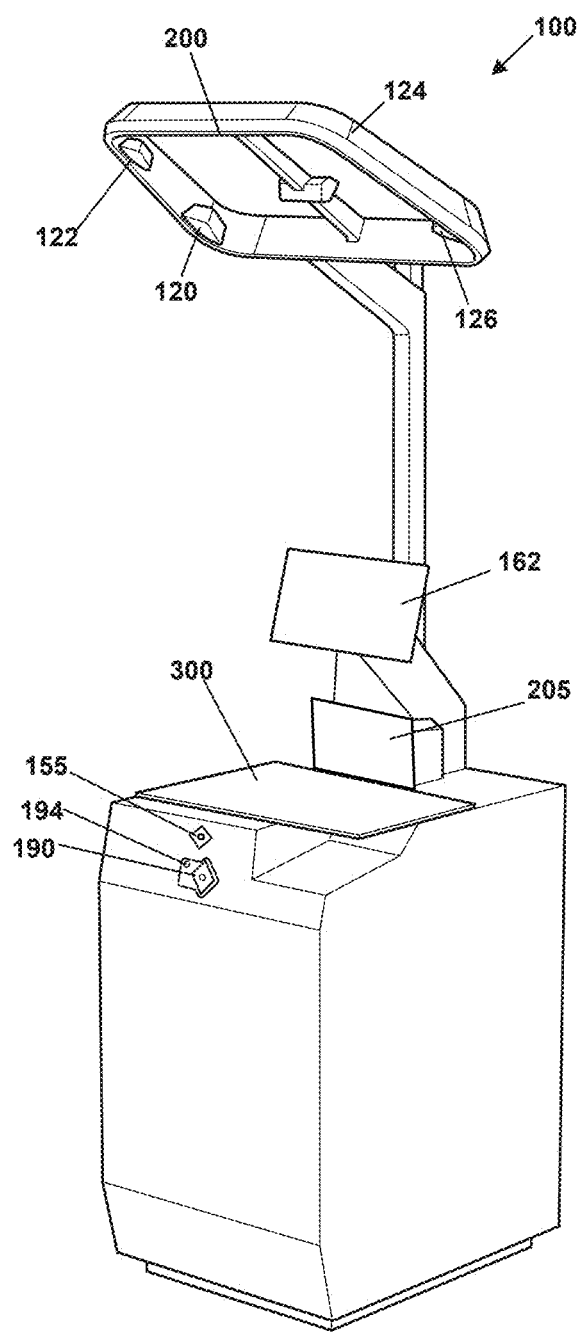
FIG. 2 is a functional drawing of a vision-based self-checkout terminal for use in the system of the current disclosure.

Referring now to FIG. 2, a functional drawing of the vision-based self-checkout terminal 100 shows two cameras 120, 122 mounted on a halo-structure 200 while the other two cameras 124, 126 are positioned inside the halo-structure 200 at the points shown in FIG. 2. As discussed above, the cameras 120, 122, 124, 126 are positioned to provide a view of the checkout tray 300. The vision-based self-checkout terminal 100 also includes the display 162, the uNav 190 with associated audio interface 194, the proximity sensor 155, and the bar-code scanner 205.

Figure 3:
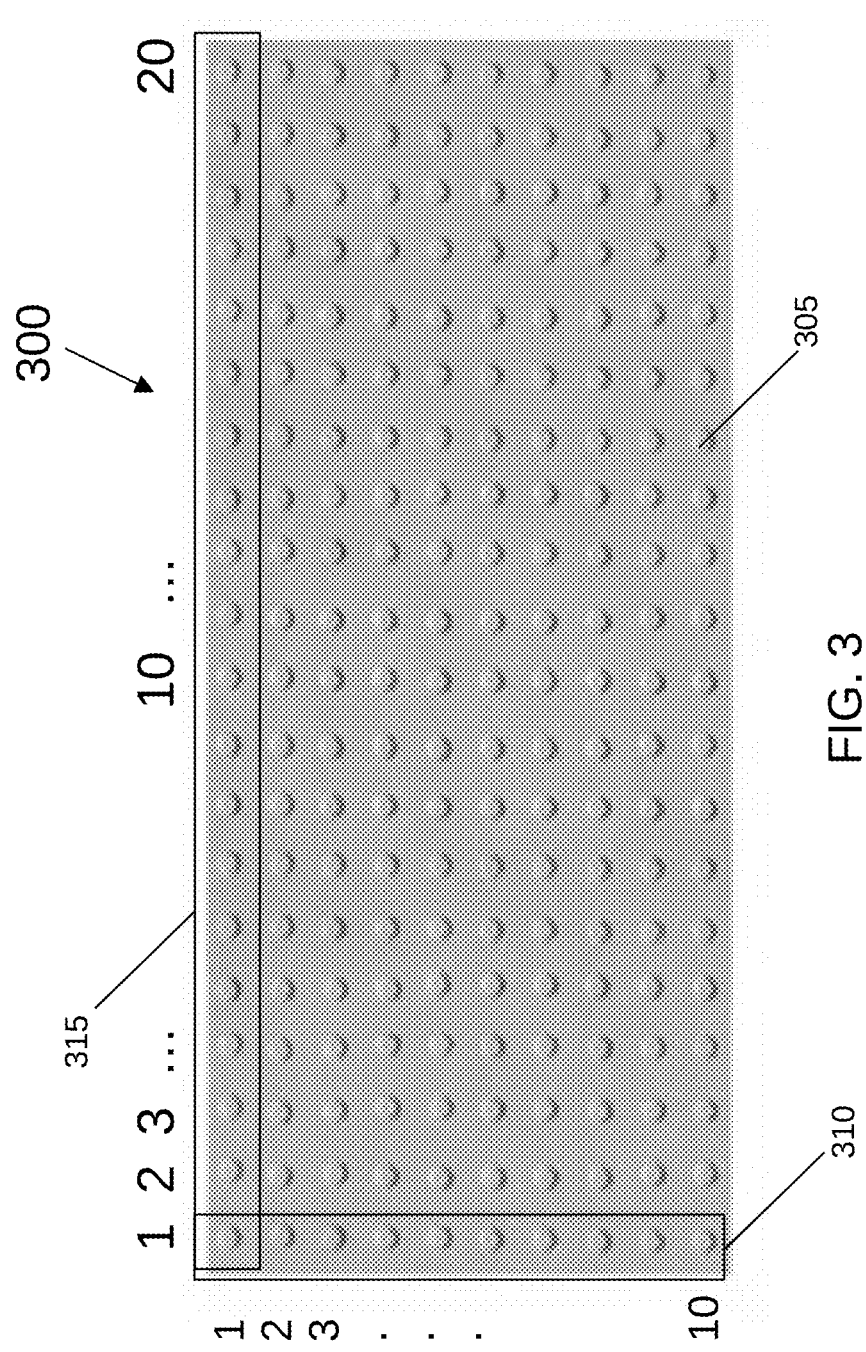
FIG. 3 is a functional diagram of a checkout surface for use with the vision-based self-checkout terminal of the current disclosure.

Referring now to FIG. 3, the checkout tray 300 is provided with an outer-facing surface which has a tactile feel that assists in identifying items located thereon. In particular, as shown in FIG. 3, checkout tray 300 has an arrangement of raised portions (dots) 305 that form a series of rows 310 and columns 315. A visually impaired customer can locate an item on the checkout tray 300 based on row and column coordinates. For example, the vision-based self-checkout terminal 100 may advise the customer via an audible message to remove an item at row five, column ten from the top left. The customer then uses their fingers to trace over the dots 305, for example counting down to the fifth dot in the first column and then counting over to the tenth dot in the fifth row to locate the item, all based on the tactile feel provided by the raised dots 305. The tactile feel provided by the raised dots 305 also assists a visually impaired customer to locate the checkout tray 300 and ensure that all items are placed on the checkout tray 300 by feeling the raised dots 305.

Figure 4:
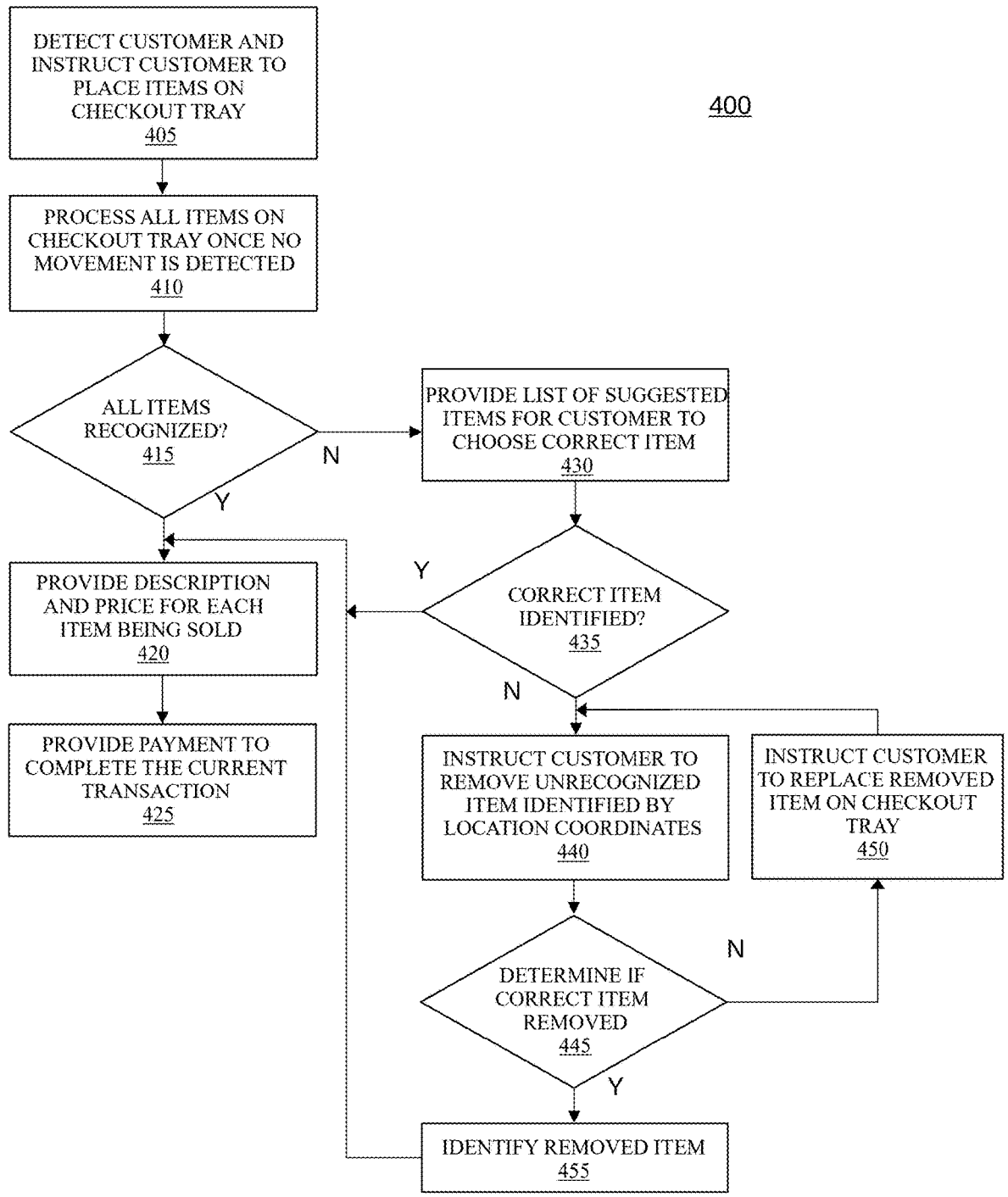
FIG. 4 is a flowchart of a method of operation of the system of the current disclosure.

Referring now to the flowchart 400 of FIG. 4, when a customer approaches and is adjacent to the vision-based self-checkout terminal 100, ready to initiate a transaction, the proximity sensor 155 detects the customer and an audio prompt is provided instructing the customer place the items to be purchased on the checkout tray 300 well separated from each other (step 405). The customer will also be advised that if additional audio assistance is required, the customer should plug their listening device (e.g., headphones) into audio jack 194 on the universal navigation module 190 on the front of the terminal 100. The uNav 190 also has a tactile feel that assists a visually impaired customer to locate the uNav 190 and plug the listening device into the audio jack 194. The customer then places the items to be purchased on the checkout tray 300, using the tactile feel provided by the raised dots 305 if necessary to ensure that all of the items are positioned properly on the checkout tray 300. Once the vision-based self-checkout terminal 100 detects that no movement is occurring on the checkout tray 300 (based on an analysis of the outputs from one or more of the cameras 120, 122, 124, 126, the vision-based self-checkout terminal 100 processes all of the items on checkout tray 300 (step 410). Then, the vision-based self-checkout terminal 100 determines if all the items on checkout tray 300 have been identified (step 415). Normally, all of the items on the checkout tray 300 will be recognized and no user interaction will be required. In this case, the vision-based self-checkout terminal 100 provides an audible report of a description and price for each item being sold (step 420). The customer then either interacts with a payment device on the vision-based self-checkout terminal 100 (e.g., card reader or cash slot) or uses controls on the uNav 190 to provide electronic payment information in order to complete the current transaction (step 425).

In some cases, an item on the checkout tray 300 may not be recognized by the vision-based self-checkout terminal 100. This can be the result when the customer does not remove their hands from the checkout tray, when items are overlapping, when items are not fully within the checkout tray 300, when the item is positioned in a way that makes it unrecognizable, or when the vision-based self-checkout terminal 100 is unable to identify the item. The vision-based self-checkout terminal 100 may then provide a list of suggested items (e.g., via the display and an audible message) and an audible prompt then guides the customer to pick the correct item using the controls on the uNav 190 (step 430). If the correct item is identified (step 435), processing reverts to step 420 discussed above. If the correct item is not identified, the vision-based self-checkout terminal 100 then provides an error message via an audible prompt that instructs the customer to remove the item by providing an identification of the location of the item (i.e., the coordinates of the item from a fixed corner) and, preferably, an identification of an approximate width and height of the item (step 440). The location of the item is provided by coordinates in the form of row and column information-based on the relationship to a fixed corner. For example, the vision-based self-checkout terminal 100 may indicate that the item is at item at row five, column ten from the top left, based on rows and columns of the raised dots 305 on the checkout tray 300. The vision-based self-checkout terminal 100 may then determine whether the customer has removed the correct item (step 445). If a different item was removed, the vision-based self-checkout terminal 100 provides an audible prompt instructing the customer to replace the removed item on the checkout tray 300 (step 450) and processing reverts to step 440 so that the system can again provide an instruction to remove the item at the particular coordinates. If the correct item was removed, a barcode thereon is then scanned using the barcode scanner 205 (step 455). In an alternative embodiment, an audible prompt will instruct the customer to use a button on the uNav 190 to access a self-checkout picklist to either select or key-in information about the unrecognized item in order to identify the unrecognized item. Once the unrecognized item (or items) on the checkout tray 300 is (are) identified, processing reverts to step 420 to complete the checkout process.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A self-service checkout terminal, comprising:
   a computing device having a processor and a non-transitory computer-readable storage medium;
   a camera coupled to the computing device and having a predefined field of view focused on a scan zone, the camera providing a video output signal of the scan zone to the computing device;
   a user interface coupled to the computing device;
   a checkout tray within the scan zone, the checkout tray having a tactile surface formed from a predefined number of rows and a predefined number of columns of raised dots; and
   wherein the non-transitory computer-readable storage medium includes executable instructions that, when executed by the processor, cause the processor to:
      process the video output signal from the camera to attempt to identify an item placed on the checkout tray by a user during a transaction;
      provide a description of the item to the user via the user interface when the item is identified; and provide the user with an indication of a location of the item on the checkout tray via the user interface when the item is not identified, wherein the indication of the location of the item comprises a row coordinate and a column coordinate, from a fixed corner of the checkout tray, the row coordinate and column coordinate each representing a number of the raised dots along the respective row and column from the fixed corner of the checkout tray.

2. The self-service checkout terminal of claim 1, comprising:
a proximity sensor coupled to the computing device, the proximity sensor configured to detect when the user is adjacent to the self-checkout terminal; and
wherein the non-transitory computer-readable storage medium includes executable instructions that, when executed by the processor, cause the processor to initiate the transaction when the proximity sensor detects that the user is adjacent to the self-checkout terminal.

3. The self-service checkout terminal of claim 2, wherein the user interface comprises an audio jack, and wherein the non-transitory computer-readable storage medium includes executable instructions that, when executed by the processor, cause the processor to provide an audio prompt to the user advising that the audio jack is available for use in obtaining additional audio assistance when the proximity sensor detects that the user is adjacent to the self-checkout terminal.

4. The self-service checkout terminal of claim 1, wherein the user interface comprises an audio interface for providing audible messages to the user.

5. The self-service checkout terminal of claim 1, wherein the non-transitory computer-readable storage medium includes executable instructions that, when executed by the processor, cause the processor to instruct the user, via the user interface, to remove the item from the checkout tray, when the item is not identified, based on the provided indication of the location of the item.

6. The self-service checkout terminal of claim 5, wherein a plurality of items are positioned on the checkout tray and wherein the non-transitory computer-readable storage medium includes executable instructions that, when executed by the processor, cause the processor to determine when the user removed one of the plurality of items from the checkout tray that does not correspond to the unidentified item and then to instruct the user, via the user interface, to replace the removed item.

7. The self-service checkout terminal of claim 5, comprising:
a barcode scanner coupled to the computing device; and
wherein the non-transitory computer-readable storage medium includes executable instructions that, when executed by the processor, cause the processor to instruct the user, via the user interface, to scan the item removed from the checkout tray with the barcode scanner.

8. A method of operating a self-service checkout terminal, comprising:
processing a video output signal from a camera to attempt to identify an item placed on a checkout tray by a user during a transaction, the camera coupled to a computing device and having a predefined field of view focused on a scan zone, the camera providing a video output signal of the scan zone, the checkout tray having a tactile surface formed from a predefined number of rows and a predefined number of columns of raised dots, the checkout tray positioned within the scan zone;
providing a description of the item to the user via a user interface when the item is identified; and
providing the user of an indication of a location of the item via the user interface when the item is not identified, wherein the indication of the location of the item comprises a row coordinate and a column coordinate, from a fixed corner of the checkout tray, the row coordinate and column coordinate each representing a number of the raised dots along the respective row and column from the fixed corner of the checkout tray.

9. The method of operating a self-service checkout terminal of claim 8, comprising initiating the transaction when a proximity sensor detects that the user is adjacent to the self-checkout terminal.

10. The method of operating a self-service checkout terminal of claim 9, comprising providing an audio prompt to the user advising that an audio jack is available for use in obtaining additional audio assistance when the proximity sensor detects that the user is adjacent to the self-checkout terminal.

11. The method of operating a self-service checkout terminal of claim 8, wherein the user interface comprises an audio interface for providing audible messages to the user.

12. The method of operating a self-service checkout terminal of claim 8, comprising instructing the user, via the user interface, to remove the item from the checkout tray, when the item is not identified, based on the provided indication of the location of the item.

13. The method of operating a self-service checkout terminal of claim 12, wherein a plurality of items are positioned on the checkout tray and comprising determining when the user removed one of the plurality of items from the checkout tray that does not correspond to the unidentified item and then instructing the user, via the user interface, to replace the removed item.

14. The method of operating a self-service checkout terminal of claim 12, comprising instructing the user, via the user interface, to scan the item removed from the checkout tray with a barcode scanner.

\* \* \* \* \*